United States Patent Office 3,242,199
Patented Mar. 22, 1966

3,242,199
16-OXIMINO-ESTRA-1,3,5(10)7-TETRAENE DERIVATIVES
Max N. Huffman, Colorado Springs, Colo.
(62 N. 27th St., Omaha, Nebr.)
No Drawing. Filed Oct. 31, 1963, Ser. No. 320,539
3 Claims. (Cl. 260—397.5)

This invention relates to oximino steroids and production thereof. In particular, it relates to 16-oximino-17β-hydroxy steroids of the following general formula

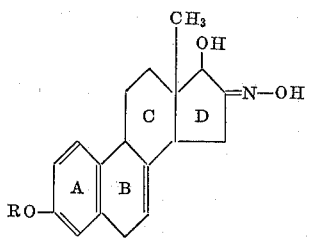

wherein R is member of the group consisting of hydrogen, a loweralkyl radical, and a loweralkenyl radical.

The oximino steroids which comprise this invention have useful physiological properties. For instance, 16-oximino-3-methoxyestra-1,3,5(10),7-tetraen-17β-ol is uniformly the most powerful stimulator of phagocytosis by the reticulo-endothelial system of any steroid known at small dosage. Steroids of this group have strong physiological activity when administered by mouth. They furthermore have little estrus-producing activity.

The reticulo-endothelial system plays an important part in cholesterol metabolism. Cholesterol-containing macromolecular aggregates appear to be phagocytosed by cells of the reticulo-endothelial system. Stimulation of the reticulo-endothelial system accelerates the reduction in blood cholesterol levels.

It is an object of this invention to provide steroids which stimulate the reticulo-endothelial system and which have a negligible estrogenic effect. It is another object of this invention to provide efficient methods for producing such steroids.

The oximino steroids which comprise this invention are produced in a sequence of two organic reactions starting from the 16-oximino-17-keto steroids (I) which are converted to 16-keto-17β-hydroxy steroids (II) which are in turn converted to 16-oximino-17β-hydroxy steroids (III).

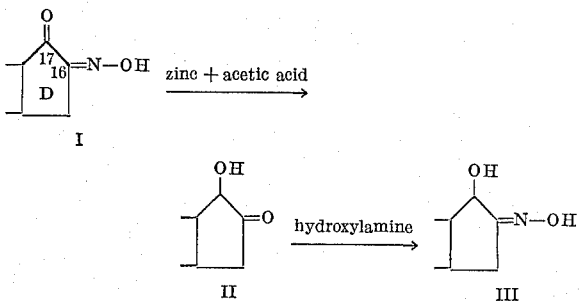

The 16-oximino-17-keto steroids (I) which are starting materials for compounds which comprise this invention can be produced by methods disclosed in my application Serial No. 235,830, of filing date November 6, 1962, now Pat. No. 3,159,656. Such 16-oximino-17-keto steroids (I) are reduced by zinc dust in boiling aqueous acetic acid to yield 16-keto-17β-hydroxy steroids (II) which may be obtained from the reaction mixture by diluting the aqueous acetic acid reaction solution, after separation from undissolved zinc, with water and then filtering the white crystals. The intermediate 16-keto-17β-hydroxy steroids (II) are then reacted with hydroxylamine or a buffered salt thereof in boiling ethanolic solution to yield the final products which are 16-oximino-17β-hydroxysteroids (III). The 16-oximino 17β-hydroxysteroids may be obtained from the ethanolic reaction solution by condensation, refrigeration, and filtration, and further purified by recrystallization from methanol if desired.

The invention is disclosed in further detail by means of the following examples which are provided merely for the purpose of illustrating the invention. It will be appreciated by those skilled in the art that numerous modifications in equivalent materials and operating conditions can be made without departing from the invention as disclosed herein.

EXAMPLE 1

*16-oximino-estra-1,3,5(10),7-tetraen-3,17β-diol*

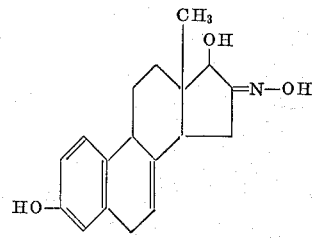

A solution of 475 mg. of 16-oximino-estra-1,3,5(10),7-tetraen-3-ol-17-one in 45 ml. of equal parts acetic acid and water was refluxed for 2.5 hours over 1.45 g. of zinc dust. The cooled reaction solution was decanted from the excess solid zinc and diluted with 110 ml. of water. After refrigeration, the precipitated crystals of 16-keto-estra-1,3,5(10),7-tetraene-3,17β-diol were filtered and washed well with water. The crystalline 16-keto-estra-1,3,5(10),7-tetraene-3,17β-diol was placed in a flask with 530 mg. of hydroxylamine hydrochloride, 1060 mg. of sodium acetate trihydrate, 47.5 ml. of ethanol, and 5 ml. of water. The mixture, which becomes a solution, was refluxed for 2 hours, and after the addition of another 47.5 ml. of water, the solvent distilled off until crystallization took place. After refrigeration, the crystals of 16-oximino-estra-1,3,5(10),7-tetraen-3,17β-diol were filtered off. Recrystallization from aqueous methanol gave 214 mg. of which one-half was recrystallized one from methanol-ethylene dichloride and once from methanol to give 84 mg. of product melting at 197° with decomposition.

EXAMPLE 2

*3-methoxy-16-oximino-estra-1,3,5(10),7-tetraen-17β-ol*

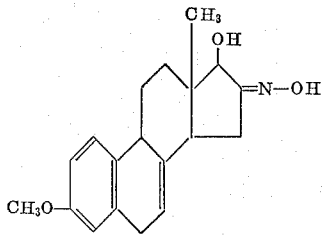

A solution of 665 mg. of 3-methoxy-16-oxidimino-estra-1,3,5(10),7-tetraen-17-one in 60 ml. of equal parts acetic acid and water was refluxed for 2.5 hours over 2.0 g. of zinc dust. The cooled reaction solution was decanted from excess solid zinc and diluted with 140 ml. of water. After refrigeration, the precipitated crystals of 3-methoxy - 16 - keto-estra-1,3,5(10),7-tetraen-17β-ol were filtered and washed well with water. The crystalline 3 - methoxy-16-keto-estra-1,3,5(10),7-tetraen-17β-ol was placed in a flask with 740 mg. of hydroxylamine hydrochloride, 1480 mg. of sodium acetate trihydrate, 66.5 ml. of ethanol, and 8 ml. of water. The mixture, which becomes a solution, was refluxed for 2 hours, and after the addition of another 66.5 ml. of water, the solvent distilled off until crystallization took place. After refrigeration, the crystalline 3-methoxy-16-oximino-estra-1,3,5(10),7-tetraen-17β-ol was filtered off. Recrystallization, once from aqueous methanol, once from methanol-ethylene dichloride, and twice from methanol gave 306 mg. of product melting at 180–181°.

EXAMPLE 3

*3-allyloxy-16-oximino-estra-1,3,5(10),7-tetraen-17β-ol*

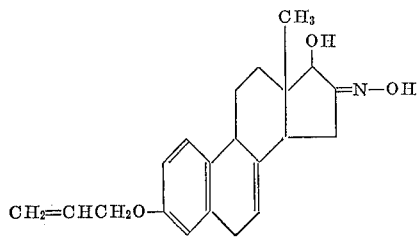

A solution of 290 mg. of 3-allyloxy-16-oximino-estra-1,3,5(10),7-tetraen-17-one in 30 ml. of equal parts acetic acid and water was refluxed for 2.5 hours over 0.81 g. of zinc dust. The cooled reaction solution was decanted from excess solid zinc, the zinc rinsed with 10 ml. of 50% acetic acid and the combined solutions refrigerated. The white crystals of 3-allyloxy-16-keto-1,3,5(10),7-tetraen-17β-ol were placed in a solution of 310 mg. of hydroxylamine hydrochloride and 620 mg. of sodium acetate trihydrate in 29 ml. of ethanol plus 3 ml. of water. The solution was refluxed for 2 hours, 29 ml. of water added, and then distilled to turbidity. After refrigeration, the crystalline 3-allyloxy-16-oximino-estra-1,3,5(10),7-tetraen-17β-ol was filtered off and washed well with water. Recrystallization once from aqueous methanol and once from methanol gave 82 mg. of product which melts at 162–164° with decomposition.

I claim:
1. 16-oximino-estra-1,3,5(10),7-tetraene-3,17β-diol.
2. 3-methoxy - 16 - oximino-estra-1,3,5(10),7-tetraen-17β-ol.
3. 3-allyloxy - 16 - oximino-estra-1,3,5(10),7-tetraen-17β-ol.

No references cited.

LEWIS GOTTS, *Primary Examiner.*

ELBERT L. ROBERTS, *Examiner.*